United States Patent
Wang et al.

(10) Patent No.: US 7,835,605 B1
(45) Date of Patent: Nov. 16, 2010

(54) HIGH TEMPERATURE SUSTAINABLE FIBER BRAGG GRATINGS

(75) Inventors: Dongning Wang, Hong Kong (HK); Yuhua Li, Hong Kong (HK); Jian Lu, Hong Kong (HK)

(73) Assignee: Hong Kong Polytechnic University, Hong Kong (HK)

( * ) Notice: Subject to any disclaimer, the term of this patent is extended or adjusted under 35 U.S.C. 154(b) by 0 days.

(21) Appl. No.: 12/470,367

(22) Filed: May 21, 2009

(51) Int. Cl.
*G02B 6/34* (2006.01)
(52) U.S. Cl. .................... 385/37; 264/1.27; 65/392
(58) Field of Classification Search ............... 385/37; 65/392; 264/1.27
See application file for complete search history.

(56) References Cited

U.S. PATENT DOCUMENTS

| | | | | |
|---|---|---|---|---|
| 5,400,422 A | * | 3/1995 | Askins et al. | 385/37 |
| 6,542,668 B2 | * | 4/2003 | Gaylord et al. | 385/37 |
| 6,788,864 B2 | * | 9/2004 | Ahmad et al. | 385/123 |
| 7,574,075 B2 | * | 8/2009 | Xia | 385/37 |
| 2005/0259944 A1 | * | 11/2005 | Anderson et al. | 385/147 |
| 2008/0245960 A1 | * | 10/2008 | Csutak | 250/269.1 |

OTHER PUBLICATIONS

Canning, "Fibre gratings and devices for sensors and lasers," Laser & Photon. Rev. 2, No. 4, 275-289, May 2008.

* cited by examiner

*Primary Examiner*—Charlie Peng
(74) *Attorney, Agent, or Firm*—Ella Cheong (Hong Kong) Ltd; Margaret Burke

(57) ABSTRACT

An optical fiber 200 with a high thermal resistance fiber Bragg grating (FBG) 130. Compared to existing FBG's, the invention provides greatly enhanced thermal stability, being stable up to 1200° C. The grating reflectivity and resonant wavelength are maintained for extended duration at high temperatures. The FBG is thus suitable in high temperature sensors. The high thermal resistance of the FBG is obtained in a method of pre-annealing the optical fiber 105 at high temperature prior to inscribing the FBG. The high thermal resistance is optionally enhanced in a post-FBG creation step of heat treating the optical fiber 105 and FBG.

5 Claims, 5 Drawing Sheets

HIGH TEMPERATURE SUSTAINABLE FIBER BRAGG GRATINGS

RELATED APPLICATION

There are no related applications.

TECHNICAL FIELD

The invention relates to optics, and in particular related to waveguides having wavelength-specific functional elements that maintain their optical characteristics at high temperatures. With greater particularity the invention relates to optical fibers having Fiber Bragg gratings (FBG) that maintain their optical characteristics at high temperatures, in particular up to 1200° C.

TECHNICAL BACKGROUND

A fiber Bragg grating is a distributed Bragg reflector constructed in a waveguide such as in the core of an optical fiber (FIG. 1). The Bragg grating is created by periodically varying the refractive index of the core of the optical fiber. The Bragg grating thus acts as a wavelength-specific dielectric mirror, blocking or reflecting certain wavelengths of radiation passing along the waveguide. The blocked or reflected Bragg wavelength typically varies in a known manner with ambient temperature, rendering FBG's applicable as temperature sensors.

Bragg fiber gratings have been made in several ways, whereby the periodic variation is created by irradiating a photosensitive optical fiber. The irradiation source is usually a high intensity UV laser. The specific pattern of the Bragg grating is typically created by interference, use of a photomask or point by point inscription by a narrow focus laser beam.

Although FBG are usually referred to as a permanent refractive index modulation in the fiber core, exposure to high-temperature environments may result in the bleach and eventual erasure of the refractive index modulation, especially at extended time periods.

The maximum usable temperature for conventional FBGs is around 600° C. due to the weak bonds of germanium and oxygen in the optical fiber. Various methods have been employed in an attempt to increase the maximum usable temperature, including accelerated aging, pre-irradiation, formation of type II (damage inscribed) gratings, specialist ion-doped fibers and chemical composition fibers. Recently, FBGs fabricated by use of femtosecond laser pulses have exhibited enhanced thermal stability, up to about 1000° C. Such FBGs are referred to as type II damage written gratings, since the ultra high peak power locally affects the glass structure of the fiber. Type II-IR gratings are created when the laser intensity is greater than the damage threshold of the particular glass.

However, the thermal stability still can not be maintained when the temperature is increased to 1100° C. or higher. This has severely limited the applicability of FBG's as high temperature sensors.

SUMMARY OF THE INVENTION

It is an object of the claimed invention to provide a fiber Bragg grating usable at high temperatures. The claimed invention provides an optical fiber, with a core and cladding, with a high thermal resistance fiber Bragg grating in the core. The claimed invention makes a significant advance over conventional fiber Bragg gratings which are unusable above 1000° C. High thermal resistance means that at temperatures elevated above 1000° C. the fiber Bragg grating sustains its optical characteristics, whereas the optical characteristics of conventional fiber Bragg gratings decay rapidly, i.e. the fibers according to the claimed invention are thermally stable. The grating reflectivity of the FBGs of the claimed invention are maintained at high temperatures, high being temperatures over 1000° C. The reflection wavelength of the FBGs of the claimed invention varies with temperature, but at any particular temperature—has a specific operating temperature—has a single resonance wavelength. In particular, the FBGs of the claimed invention are thermally stable above 1100° C., and are stable up to at least 1200° C. The optical characteristics are preferably sustained for at least 20 hours. Moreover, the FBGs of the claimed invention do not exhibit hysteresis during thermal cycling. The FBGs of the claimed invention thus have the advantage that when used as sensors, readings can be taken easily and reliably, with no drift in the readings.

The claimed invention provides fiber Bragg gratings with high thermal stability, by heat treating the optical fiber prior to creating the fiber Bragg grating. Preferably the optical fiber is made of glass.

The heat treatment prior to creating the grating of the claimed invention surprisingly improves the thermal resistance of the fiber Bragg grating. Said heat treatment partially or wholly relaxes the residual stress existing in the optical fiber which originates from the production process. The residual stress has two components, namely the thermal stress, caused by the difference in thermal expansion coefficients between the core and the cladding of the optical fiber, and the mechanical stress induced by the difference in the viscoelastic properties of the core and cladding.

Preferably the claimed invention provides that the fiber is heat treated or annealed at a temperature in the range 800° C. to 1200° C. for a period of time, preferably 2 to 10 hours. Preferably the fiber is annealed at a temperature close to or preferably above an intended operating temperature of the optical fiber. Annealing at a higher temperature, such as 1100° C., provides improved thermal resistance. Other temperatures and time periods of the heat treatment may be selected according to the properties of the material that will relax the residual stress.

It is a further object of the claimed invention to increase the high thermal stability imparted by the heat treatment prior to creating the fiber Bragg grating. The claimed invention may provide that fiber Bragg grating is any kind of fiber Bragg grating, but preferably it is created as a damage written grating. Advantageously this will locally alter the microstructure of the core of the optical fiber and increase the high thermal resistance. The claimed invention may optionally additionally provide an improvement in the high thermal stability by further heat treating the optical fiber after the fiber Bragg grating has been created. Preferably the fiber is heat treated in a ramped temperature treatment, such as the temperature being raised to 900° C. and held, then raised to 950° C. and held, the temperature being raised consecutively in a ramp and hold pattern until the final end temperature is reached. Preferably the final end temperature is 1200° C. Preferably the temperature is raised in 5° C. to 10° C. increments and held at each incremented temperature for an extended period. The extended period may be about 2 hours. Other temperature increments may also be used.

The claimed invention also provides a method of manufacturing the optical fiber having a high thermal stability fiber Bragg grating. In said method the fiber is annealed annealing the optical fiber at a first selected temperature and then the fiber Bragg grating is created.

The claimed method of the invention provides that the fiber Bragg grating is created by laser irradiation. The laser irradiation is provided by one or more lasers selected from the group of long pulse UV lasers and femtosecond IR lasers.

The claimed method of the invention also provides the step of heat treating the optical fiber after creating the fiber Bragg grating, at consecutively increasing second selected temperatures.

Other aspects of the claimed invention are also disclosed.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

Figure 1:
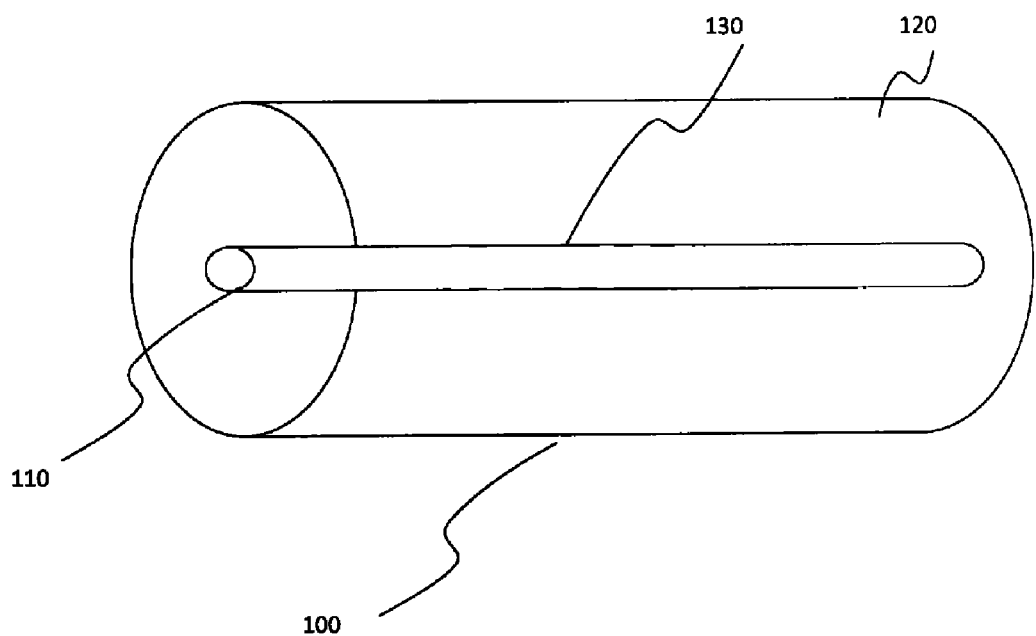
FIG. 1 shows a conventional optical fiber with a fiber Bragg grating shown schematically.

The optical fiber 100 of FIG. 1 is a linearly extending tubular core 110 surrounded by tubular cladding 120. A fiber Bragg grating 130 is shown schematically. The refractive index (not shown) of core, cladding and grating is different.

The optical fibers with high thermal resistance fiber Bragg grating were firstly annealed in a tube furnace (not shown). The tube furnace's ends were tightly closed to maintain a uniform temperature within the furnace. Other furnaces may also be used. One set of fibers was annealed at 800° C. and another set at 1100° C. for about 5 hours to relax the residual stress in the fibers. After annealing the fibers were allowed to air cool.

Figure 2:
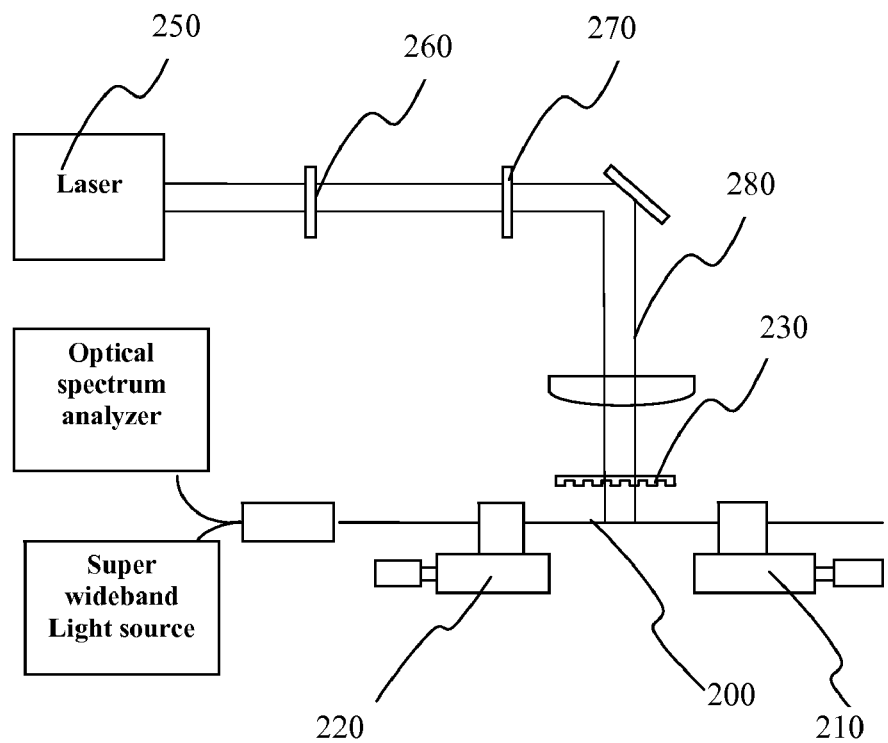
FIG. 2 shows an apparatus used in the method of manufacturing the fiber Bragg grating.

As shown in the embodiment of FIG. 2, the optical fiber 200—being a Corning® SMF 28 optical fiber—was positioned in a high-precision four-axis translation stage 210, 220. A silica phase mask 230 was positioned and prior to inscription brought into close proximity with the fiber 200, preferably within ~300 μm by use of the high-precision four-axis translation stage. Laser beam irradiation 240 from laser system 250 was focused on the optical fiber 200 through the phase mask 230.

The grating inscription was performed by use of a titanium:sapphire laser system 250 consisting of an oscillator and an amplifier (neither shown). The amplified laser system 250 emitted pulses of 120 fs of linearly polarized light at a central wavelength of approximately 800 nm ($TEM_{00}$ spatial mode, repetition rate of 1 kHz) and a 1/e Gaussian beam radius of $\omega_o$=2 mm. The maximum pulse energy of the laser output was approximately 1 mJ, which could be attenuated by rotating a half waveplate 260 followed by a linear polarizer 270.

The laser beam irradiation 240 was focused using a cylindrical lens 280 with a focal length of 60 mm through the silica phase mask 230 into the fiber core 110. In the embodiment shown, the width of the focal spot size was 7.6 μm. The phase mask 230 used was optimized for 800 nm illumination, with the first-order diffraction efficiency of 72.8%. The laser focus was adjusted in a way that to allow the beam to enter the fiber core to ensure the efficient grating inscription.

FIG. 2 also shows a super wideband light source and an optical spectrum analyzer used to measure the properties of the created fiber Bragg gratings.

Figure 3:
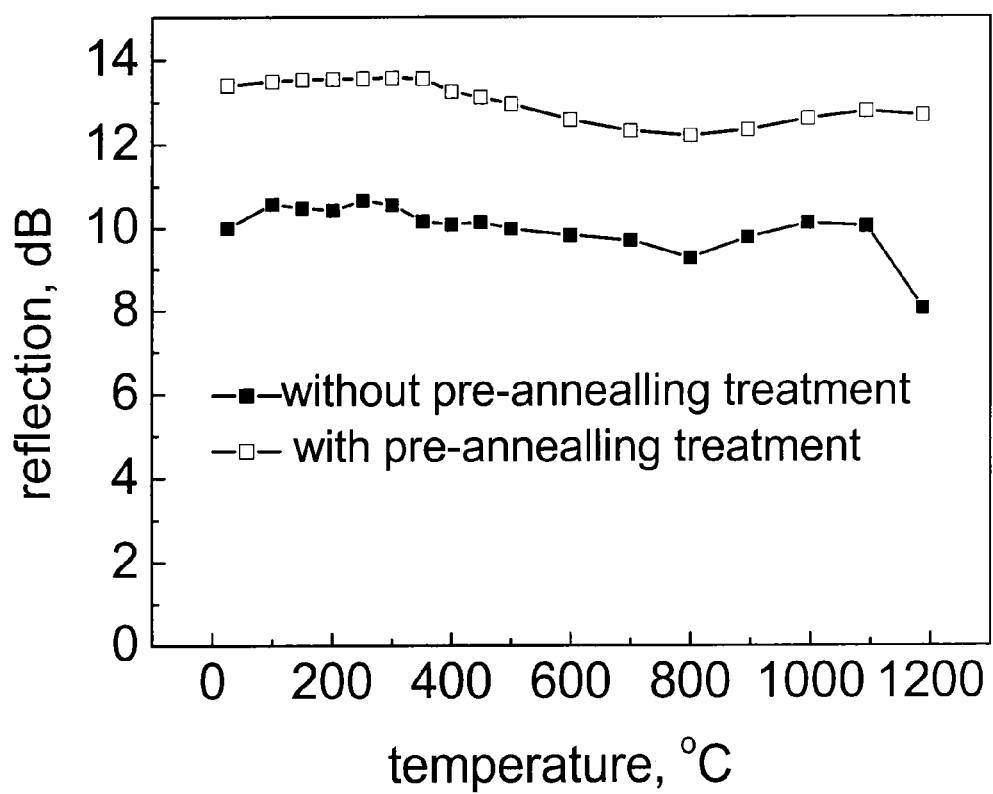
FIG. 3 plots a comparison between grating reflectivity and temperature for conventional and heat treated optical fibers.

FIG. 3 plots variation of reflection against temperature. Conventional and pre-heat treated fibers were subjected to short-term thermal exposures (30 minutes at each temperature) in the tube furnace (not shown) at 100° C., 200° C. and then progressively to 1200° C. with a temperature increment of 100° C. When the temperature was increased, the FBGs in both types of fibers were thermally stable at the temperatures up to 1000° C., above which a portion (about 20%) of the refractive index change was annealed out for the gratings written in the fibers without pre-annealing treatment, resulting in a degradation of the grating reflectivity from 10.04 to 8.048 dB within a few minutes when the temperature reached 1200° C. However, the FBGs created in the fibers with the pre-annealing treatment readily sustained their optical properties at temperatures higher than 1000° C. 320, with 95% of their initial reflectivity remaining, and showed an almost negligible decay rate after a 30 min exposure at the temperature of 1200° C. Moreover the pre heat treated fibers exhibited higher reflectivity at all temperatures.

Figure 4:
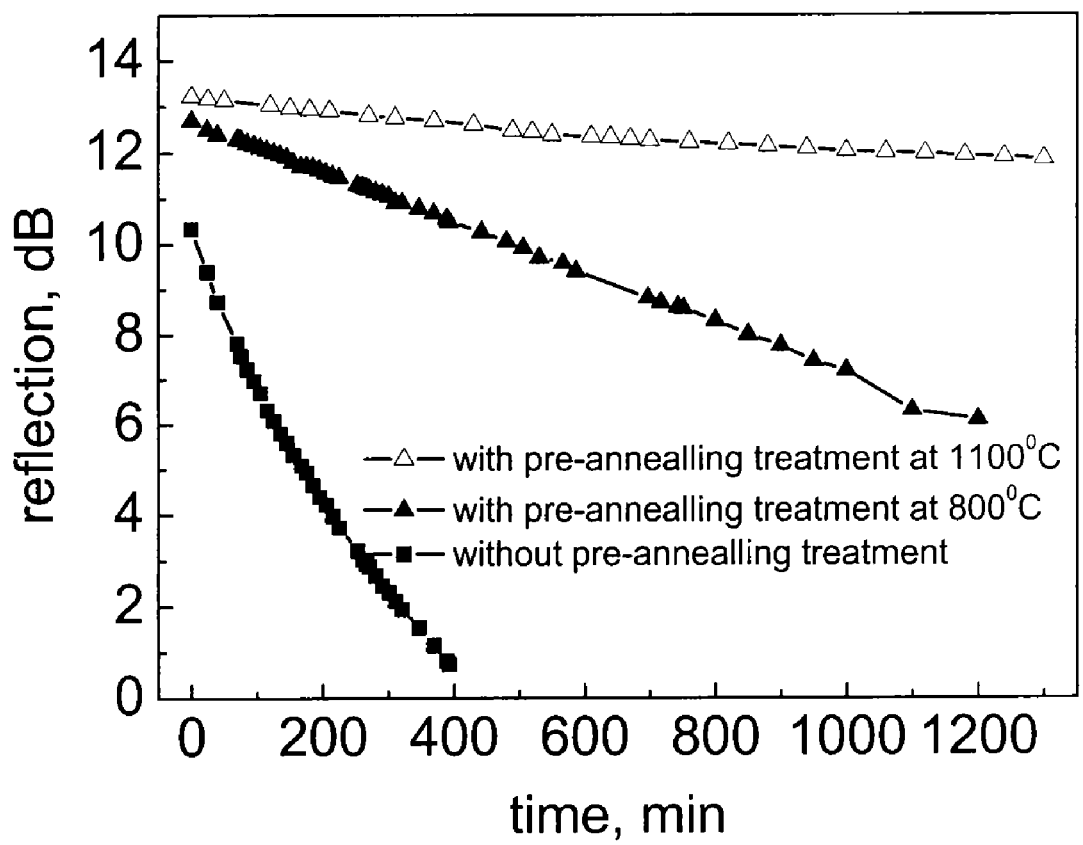
FIG. 4 plots grating reflectivity against time for damage inscribed FBGs in conventional and pre-annealed fibers over a 1300 minute period.

FIG. 4 shows long-term thermal stability tests for conventional and pre heat treated damage-inscribed gratings. The gratings were heated to 1200° C. and then kept there for about 20 hours with the evolution of the grating reflectivity and the resonant wavelength (not shown) being recorded respectively. Gratings written in pre-annealed fibers (either at 800° C. or 1100° C.) exhibited enhanced thermal stability. However, type II FBGs created by femtosecond pulses in the non-annealed fibers were almost "washed out" after about 400 minutes exposure at the temperature of 1200° C.

The gratings written in the pre-annealed fibers that were heat treated at 800° C. had a relatively slow decay rate and the reflectivity decreased by only about 2.44 dB after 700 min. The type II-IR gratings written in the pre-annealed fibers annealed at 1100° C. were almost unaffected by the thermal exposure at temperatures up to 1200° C., with only a slight degradation of the grating strength for the duration of the test.

The resonance wavelength of conventional fibers and the pre-annealed fibers at 800° C. shifted slowly with time at high temperature, shifting towards a shorter wavelength, which coincided with the grating decay. In comparison for the gratings written in pre-annealed fibers treated at 1100° C., the resonance wavelength was constant, with the variation being less than the resolution limit of the optical spectrum analyzer used.

After the long-term high temperature annealing tests, the femtosecond induced fiber gratings were cycled to room temperature and then back to 1200° C. again in order to examine the repeatability of the potential sensor reading. The grating was further heated to 1200° C., held for about 10 hours and then cycled back down to room temperature and then cycled back. No hysteresis in the resonant wavelength was exhibited.

Figure 5:
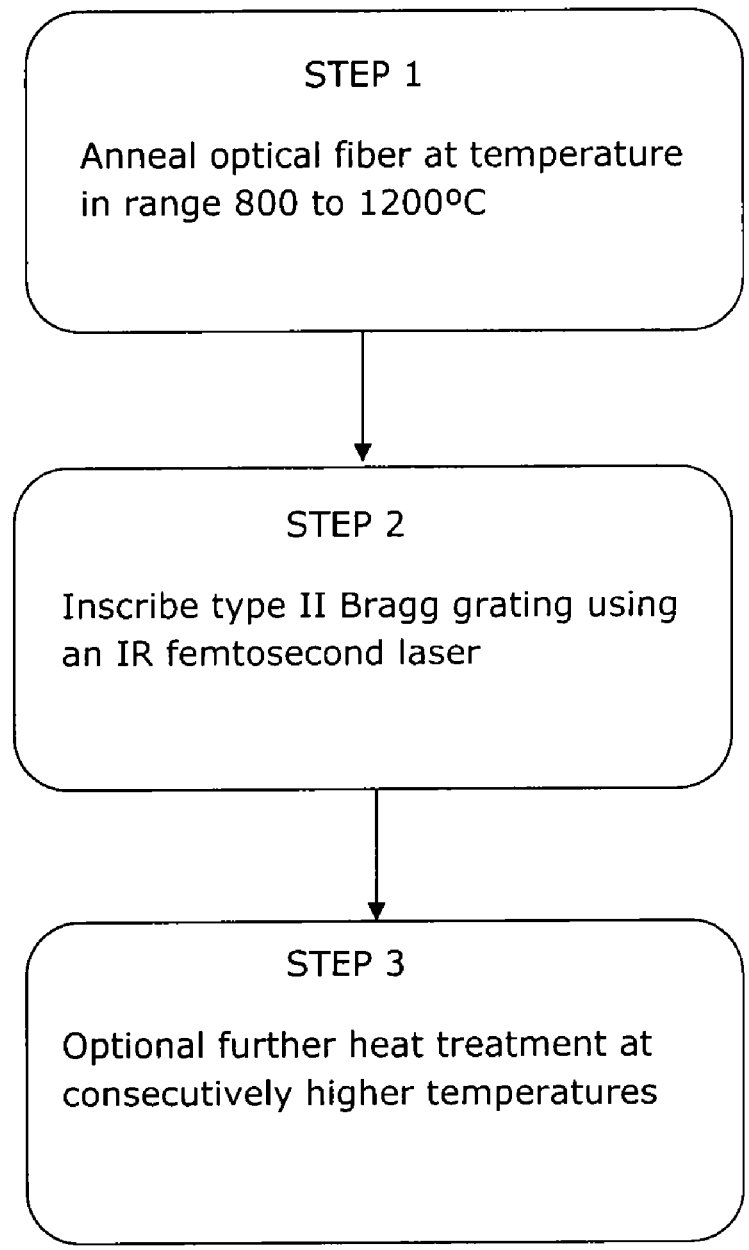
FIG. 5 shows the steps of the method of the claimed invention.

FIG. 5 shows the steps of the method according to the invention. In step one, the single mode optical fiber is heat treated at a selected first temperature, being in the range 800 to 1200° C. The fiber is heated steadily to this temperature in an air environment, and the temperature maintained for a selected time, being preferably 2 to 10 hours. The fiber is then removed and a Bragg grating is inscribed in step 2. In the embodiment shown, inscription is performed using an IR femtosecond laser to create a type II Bragg grating. In an optional third step, the inscribed laser fiber is then further heat treated at consecutively higher temperatures as described above.

The description of preferred embodiments of this claimed invention are not exhaustive and any update or modifications to them are obvious to those skilled in the art, and therefore reference is made to the appending claims for determining the scope of this claimed invention.

INDUSTRIAL APPLICABILITY

The claimed invention has industrial applicability in high temperature environments.

The claimed invention is particularly suitable in the bulk manufacture of Bragg fiber gratings, providing a low cost method of extending the high temperature sustainability of gratings in otherwise conventional single mode fibers. The FBG of the claimed invention is particularly suitable as a high temperature sensor, such as aeroengine monitoring.

We claim:

1. A method of forming a damage-written fiber Bragg grating which is thermally stable up to 1200° C. comprising:
   providing a single mode optical fiber;
   thermally annealing the single mode optical fiber at a temperature in the range of 800° C. to 1200° C. for a time sufficient to relax residual stress in the single mode optical fiber;
   forming a damage-written Bragg grating in the core of the single mode optical fiber by femtosecond pulsed laser irradiation following thermal annealing.

2. The method of forming a damage-written fiber Bragg grating according to claim 1, further comprising heat treating the optical fiber after creating the fiber Bragg grating.

3. The method of forming a damage-written fiber Bragg grating according to claim 1, wherein said femtosecond pulsed laser irradiation has a wavelength of approximately 800 nm.

4. The method of forming a damage-written fiber Bragg grating according to claim 2, wherein the heat treating comprises a ramped temperature heat treatment in which the temperature is raised to a first temperature and held, followed by consecutively raising to plural second temperatures in a ramp and hold pattern.

5. The method of forming a damage-written fiber Bragg grating according to claim 1 wherein a phase mask is used to form the fiber Bragg grating.

* * * * *